(12) United States Patent
Ren et al.

(10) Patent No.: US 11,443,550 B2
(45) Date of Patent: Sep. 13, 2022

(54) FACE RECOGNITION MONITORING SYSTEM BASED ON SPECTRUM AND MULTI-BAND FUSION AND RECOGNITION METHOD USING SAME

(71) Applicant: Jilin QS Spectrum Data Technology Co. Ltd, Changchun (CN)

(72) Inventors: Yu Ren, Changchun (CN); Gang Nie, Changchun (CN); Hao Zhou, Changchun (CN); Yuchen Liu, Changchun (CN); Xiaohui Liu, Changchun (CN); Shuo Wang, Changchun (CN); Yongsheng Zhang, Changchun (CN); Hongxing Cai, Changchun (CN); Zhihai Yao, Changchun (CN)

(73) Assignee: Jilin QS Spectrum Data Technology Co. Ltd, Changchun (CN)

( * ) Notice: Subject to any disclaimer, the term of this patent is extended or adjusted under 35 U.S.C. 154(b) by 0 days.

(21) Appl. No.: 17/555,996

(22) Filed: Dec. 20, 2021

(65) Prior Publication Data
US 2022/0114834 A1 Apr. 14, 2022

Related U.S. Application Data

(63) Continuation of application No. PCT/CN2021/096673, filed on May 18, 2021.

(30) Foreign Application Priority Data

Jun. 5, 2020 (CN) .......................... 202010503421.1

(51) Int. Cl.
*G06V 40/16* (2022.01)
*G06V 10/58* (2022.01)
(Continued)

(52) U.S. Cl.
CPC ............ *G06V 40/166* (2022.01); *G06T 5/002* (2013.01); *G06V 10/58* (2022.01); *G06V 40/168* (2022.01);
(Continued)

(58) Field of Classification Search
CPC .... G06V 40/166; G06V 10/58; G06V 40/168; G06V 30/18114; G06V 10/34;
(Continued)

(56) References Cited

U.S. PATENT DOCUMENTS 6,920,236 B2 * 7/2005 Prokoski ................ G06V 40/16
356/71
9,495,584 B1 * 11/2016 Venetianer ........... G06V 40/161
(Continued)

FOREIGN PATENT DOCUMENTS

CN 102831400 A 12/2012
CN 202887210 U 4/2013
(Continued)

*Primary Examiner* — Jose L Couso
(74) *Attorney, Agent, or Firm* — Wayne IP LLC

(57) ABSTRACT

A face recognition monitoring system based on spectrum and multi-band fusion, including a spectrum camera, a first module for acquiring a face spectral image, a second module for preprocessing data of the face spectral image, a face spectral image database and a third module for recognizing the face spectral image. The spectrum camera includes an optical lens and a silicon-based detector. The silicon-based detector includes a photoelectric conversion substrate and a filter film arranged thereon. The filter film includes N units each including a visible spectrum sensing area, a near-infrared spectral image sensing area and a RGGB image acquisition area. The N units cover all pixels on the photoelectric conversion substrate. A recognition method using the above system is also provided.

7 Claims, 8 Drawing Sheets

(51) Int. Cl.
*G06T 5/00* (2006.01)
*H04N 5/33* (2006.01)

(52) U.S. Cl.
CPC ..... *H04N 5/33* (2013.01); *G06T 2207/10048* (2013.01)

(58) Field of Classification Search
CPC ...... G06V 30/10; G06V 10/32; G06V 10/803; G06V 30/1918; G06V 40/16; G06V 40/193; G06V 40/197; G06V 40/143; G06V 40/172; G06V 40/173; G06T 5/002; G06T 2207/10048; G06T 10/20; G06T 2207/30196; G06T 2207/30201; G06T 2207/10036; G06T 2207/20221; G06T 2207/30232; H04N 5/33; H04N 5/23219; H04N 5/332; H04N 7/18–183; G06K 9/00; G06K 9/6289; G06K 9/6231; G06K 9/6274; G06K 9/6281; G06K 9/6293
See application file for complete search history.

(56) References Cited

U.S. PATENT DOCUMENTS

| | | | | |
|---|---|---|---|---|
| 9,886,640 | B1 * | 2/2018 | Chen | G06F 21/32 |
| 9,996,726 | B2 * | 6/2018 | Chen | G06V 10/143 |
| 10,452,894 | B2 * | 10/2019 | Zhang | G06V 40/166 |
| 10,523,855 | B2 * | 12/2019 | Hicks | H04N 5/2176 |
| 10,785,422 | B2 * | 9/2020 | Ortiz Egea | G06N 5/046 |
| 11,138,734 | B1 * | 10/2021 | Passmore | A61B 5/015 |
| 2003/0053664 | A1 * | 3/2003 | Pavlidis | G06V 10/143 |
| | | | | 382/117 |
| 2006/0102843 | A1 * | 5/2006 | Bazakos | G06V 40/166 |
| | | | | 250/339.05 |
| 2010/0141770 | A1 * | 6/2010 | Gomi | G06V 40/40 |
| | | | | 348/E5.09 |
| 2013/0077958 | A1 * | 3/2013 | Xu | G02B 5/201 |
| | | | | 359/359 |
| 2014/0099005 | A1 * | 4/2014 | Mogi | G06V 40/19 |
| | | | | 382/118 |
| 2019/0147676 | A1 * | 5/2019 | Madzhunkov | G06T 7/521 |
| | | | | 340/5.2 |
| 2019/0180085 | A1 * | 6/2019 | Wen | G06V 10/143 |
| 2019/0182408 | A1 * | 6/2019 | Watanabe | G06V 10/143 |
| 2020/0082160 | A1 * | 3/2020 | Li | G06K 9/6289 |
| 2020/0387728 | A1 * | 12/2020 | Andorko | G06V 40/70 |
| 2021/0211590 | A1 * | 7/2021 | Harrison | G06N 3/0454 |
| 2021/0256281 | A1 * | 8/2021 | Henson | G06V 10/143 |
| 2021/0287469 | A1 * | 9/2021 | Ryhorchuk | G06V 40/172 |
| 2021/0344852 | A1 * | 11/2021 | Isberg | G01J 3/021 |
| 2022/0048386 | A1 * | 2/2022 | Popovic | H04N 5/2254 |

FOREIGN PATENT DOCUMENTS

| | | | | |
|---|---|---|---|---|
| CN | 104881632 | A | 9/2015 | |
| CN | 104952063 | * | 9/2015 | ............... G06T 7/00 |
| CN | 105009568 | * | 10/2015 | ............... H04N 5/33 |
| CN | 108090477 | A | 5/2018 | |
| CN | 108268839 | * | 7/2018 | ............... G06K 9/00 |
| CN | 110337656 | A | 10/2019 | |
| CN | 110796079 | A | 2/2020 | |
| CN | 110874588 | A | 3/2020 | |
| CN | 210469476 | U | 5/2020 | |
| CN | 111611977 | A | 9/2020 | |
| CN | 113128481 | * | 7/2021 | ............... G06K 9/00 |
| WO | WO-2014176485 | A1 * | 10/2014 | ......... G06K 9/00255 |
| WO | 2017208233 | A1 | 12/2017 | |

* cited by examiner

FACE RECOGNITION MONITORING SYSTEM BASED ON SPECTRUM AND MULTI-BAND FUSION AND RECOGNITION METHOD USING SAME

CROSS-REFERENCE TO RELATED APPLICATIONS

This application is a continuation of International Patent Application No. PCT/CN2021/096673, filed on May 28, which claims the benefit of priority from Chinese Patent Application No. 202010503421.1, filed on Jun. 5, 2020. The content of the aforementioned application, including any intervening amendments thereto, is incorporated herein by reference in its entirety.

TECHNICAL FIELD

This application relates to facial recognition and monitoring in optical technologies, and more specifically to a face recognition monitoring system based on spectrum and multi-band fusion and a recognition method using the same.

BACKGROUND

Video surveillance has always played an important role in the security field. With the development of science and technology, the face recognition has emerged and been considered as the friendliest biometric identification strategy in the monitoring field. In the face recognition process, a facial image is dynamically captured via a camera, and then identified by comparison. The core of the face recognition is to form a recognition parameter based on the position relationship of facial organs and feature parts or a skeleton feature of the human body, and compare the recognition parameter with parameters in a template database to finally give a recognition result. Chinese patent application publication No. 110796079 A discloses a multi-camera visitor recognition method and system based on face depth feature and human body local depth feature. However, the emergence of some high-definition 3D masks and illegal spoofing methods such as facial feature change through makeup (collectively referring to real and fake human faces) results in the failure of the biometric technology and poses a huge challenge to the security. Even if the surveillance system is embedded with the face anti-spoofing by which whether the object is living can be determined through some facial actions such as raising a head, lowering the head, or reciting a string of words, it still cannot achieve the real-time intelligent analysis of the real and false faces in the video. In addition, the imaging function of the existing RGGB cameras is largely affected by environmental light conditions, and the face anti-spoofing cannot be achieved under a poor light condition.

Chinese patent application publication No. 110874588 A discloses a method and device for dynamically optimizing influence of light in the face recognition, in which a RGGB camera and an infrared binocular camera are introduced to eliminate the influence of light conditions. Chinese patent application publication No. 108090477 A discloses a face recognition method and device based on multi-spectrum fusion, which also use RGGB images and infrared images for the face recognition. Although the infrared imaging can eliminate the effect caused by poor light conditions, it still cannot play an effective role in identifying the real and fake human faces. In addition, the infrared cameras are relatively expensive and thus not suitable for promotion.

Chinese patent No. 202887210 U discloses a multi-spectrum-based face recognition system, which uses a multi-spectrum imaging system to obtain the spectral feature information of a living body, and uses the spectral reflectance of the face skin to identify the real and fake faces, effectively overcoming the spoofing attack in the face recognition. However, this recognition system involves an expensive high-precision spectrometer and still not suitable for the practical application. Therefore, it is necessary to develop a face recognition monitoring system, which can effectively and accurately recognize the real and fake human faces at low cost.

SUMMARY

In view of the above problems, an object of the present disclosure is to provide a face recognition monitoring system based on spectrum and multi-band fusion, in which a silicon-based detector is divided into multiple units, and each unit has three areas. Spectral modulation film layers of different band are respectively formed on the three areas by etching, so that the reflection multi-spectral data of the human face in visible-near-infrared band, a face image in the near-infrared band and a RGGB face image can be obtained through one camera, which greatly reduce the cost of the monitoring system. Moreover, when applied to the face recognition, this system can identify whether the detected object is derived from a real human skin based on spectral data, and can also perform further recognition according to the face image in the near-infrared band and the RGGB face image. The dual recognition effectively ensures the accuracy of the face recognition, improves the recognition security of a and avoids the false recognition.

The technical solutions of the present disclosure are described as follows.

In a first aspect, this application provides a face recognition monitoring system based on spectrum and multi-band fusion, comprising:

a spectral camera;

a first module for acquiring a face spectral image;

a second module for preprocessing data of the face spectral image;

a face spectral image database; and a third module for recognizing the face spectral image;

wherein the spectral camera comprises an optical lens and a silicon-based detector; the silicon-based detector comprises a photoelectric conversion substrate and a filter film arranged on the photoelectric conversion substrate; the filter film comprises N units, each of the N units comprises a visible spectrum sensing area, a near-infrared spectral image sensing area and a red-green-green-blue (RGGB) image acquisition area; the N units cover all pixels on the photoelectric conversion substrate;

the visible spectrum sensing area is configured to distinguish an incident visible light spectrum; the visible spectrum sensing area is formed by splicing n kinds of materials with known and different light transmittance through coating and etching one by one; the visible spectrum sensing area has a single-layer structure, comprising N sub-units $T_1, T_2 \ldots T_n$; each of the N sub-units covers M pixels on the photoelectric conversion substrate, wherein M is greater than or equal to 1; the visible spectral sensing area, the near-infrared spectral image sensing area and the RGGB image acquisition area together constitute a periodic structure;

a transmission band of the near-infrared spectral image sensing area is divided into 780-850 nm, 850-950 nm, 950-1050 nm and 1050-1200 nm, and is configured to detect a deep-layer facial feature image in a near-infrared light band with a wavelength greater than 780 nm; the near-infrared spectral image sensing area is formed by splicing four materials with known and different near-infrared transmittance through coating and etching one by one; the near-infrared spectral image sensing area has a single-layer structure, comprising four sub-units, respectively $T_{ir1}$, $T_{ir2}$, $T_{ir3}$, and $T_{ir4}$; each of the four sub-units covers M pixels on the photoelectric conversion substrate, wherein M is greater than or equal to 1; and the RGGB image acquisition area is configured to collect a face RGB image in a monitoring area; the RGGB image acquisition area comprises four sub-units respectively transmitting red, green, green and blue; each of the four sub-units of the RGGB image acquisition area covers M pixels on the photoelectric conversion substrate, wherein M is greater than or equal to 1; and the photoelectric conversion substrate is configured to convert a light signal passing through the visible spectrum sensing area into an electrical signal, and convert the electrical signal to form a digital signal or a code for output through amplification and analog-to-digital conversion; the photoelectric conversion substrate is also configured to convert a light signal passing through the near-infrared spectral image sensing area into an electrical signal, and convert the electrical signal to form a digital signal or a code for output through amplification and analog-to-digital conversion; and the photoelectric conversion substrate is also configured to convert a light signal passing through the RGGB image acquisition area into an electrical signal, and convert the electrical signal to form a digital signal or a code for output through amplification and analog-to-digital conversion;

the first module is configured to inverse a face spectrum and image data according to a signal intensity information of an incident light and a position information of a corresponding pixels on the photoelectric conversion substrate, wherein the face spectrum and image data comprises a visible-near-infrared face reflection multi-spectral data, a near-infrared face image and a RGGB face image; the near-infrared face image and the RGGB face image are acquired by image inversion; and the face reflection multi-spectral data is inversed according to formula (1):

$$S_i = \int I(\lambda) T_i(\lambda) \eta(\lambda) d\lambda, \qquad (1)$$

wherein S is an intensity value of a light signal output by the photoelectric conversion substrate; I is an incident spectrum, which is a signal to be solved; T is a spectral transmittance of the filter film, comprising a spectral transmittance of a visible light filter film and a spectral transmittance of a near-infrared light filter film; η is a quantum efficiency of the photoelectric conversion substrate; and λ is an incident wavelength;

the second module is configured to denoise the near-infrared face image acquired in the near-infrared spectral image sensing area and the RGGB face image acquired in the RGGB image acquisition area; to perform feature extraction on a denoised near-infrared face image and a denoised RGGB face image; to extract a face multi-spectral data from a multi-spectral image acquired in the visible spectrum sensing area and a multi-spectral image acquired in the near-infrared spectral image sensing area; and to compare a multi-dimensional facial feature data with a face spectral image and a multi-spectral data in the face spectral image database;

the face spectral image database is configured to store an image feature value and spectrum data of $N_x$ eigenfaces to be searched, and multi-spectral data of multiple mask materials, so as to facilitate a comparison with a face image and a spectrum thereof collected in the monitoring area; and the third module is configured to compare the visible-near-infrared face reflection multi-spectral data, a preprocessed near-infrared face image and a preprocessed RGGB face image data with information in the face spectral image database.

In an embodiment, the face recognition monitoring system further comprises a light source; wherein an emission band of the light source comprises a visible light band and a near-infrared light band; and the light source is configured to illuminate the monitoring area under conditions of insufficient light to enhance a deep-layer facial image acquisition.

In an embodiment, the optical lens is capable of automatically adjusting a focal length according to a distance from a target in the monitoring area.

In an embodiment, the silicon-based detector is a complementary metal oxide semiconductor (CMOS) image sensor or a charge coupled device (CCD) image sensor.

In an embodiment, the visible spectrum sensing area is prepared through steps of:

selecting n kinds of polyimide filter film materials varying in spectral transmittance;

coating a first filter film material on the photoelectric conversion substrate followed by coating an etching layer to etch an area unneeded to be coated with the first filter film material according to a corresponding pixel on the photoelectric conversion substrate; and coating a second filter film material followed by coating another etching layer to etch an area unneeded to be coated with the second filter film material according to a corresponding pixel on the photoelectric conversion substrate, and so on until the n kinds of filter film materials are coated on the photoelectric conversion substrate;

the near-infrared spectral image sensing area is prepared according to the steps for preparing the visible spectrum sensing area, and four kinds of filter film materials are coated on the near-infrared spectral image sensing area.

In an embodiment, a microlens array is formed on the filter film; the microlens array is prepared through steps of: coating a layer of a transparent photoresist on the filter film; and etching an area unneeded to be coated with the transparent photoresist by laser direct writing or mask lithography to form the microlens array; wherein microlenses of the microlens array are in one-to-one correspondence to the pixels on the photoelectric conversion substrate, and the microlens array is configured to converge incident light beams.

In a second aspect, the present disclosure also provides a recognition method based on the above face recognition monitoring system, comprising:

(S1) allowing the optical lens of the spectral camera to perform automatic to make a face of a subject to be recognized clearly imaged when the subject to be recognized enters the monitoring area; wherein when there are multiple subjects to be recognized, the spectral camera simultaneously targets faces of the multiple subjects to be recognized and the optical lens performs automatic focusing to make the faces of the multiple subjects to be recognized clearly imaged; and in the case of insufficient light, a light source is turned on;

(S2) starting the silicon-based detector and the first module;

collecting, by the visible spectrum sensing area and the near-infrared spectral image sensing area on the silicon-based detector, a face reflection multi-spectral data of the subject to be recognized;

collecting, by the near-infrared spectrum image sensing area, a near-infrared face image information of the subject to be recognized; and collecting, by the RGGB image acquisition area, a face RGB image information of the subject to be recognized;

(S3) comparing the face reflection multi-spectral data obtained by the visible spectrum sensing area and the near-infrared spectral image sensing area with multi-spectral data of a living tissue and multiple mask materials in the face spectral image database;

if a comparison result shows that the face reflection multi-spectral data obtained by the visible spectrum sensing area and the near-infrared spectral image sensing area matches the multi-spectral data of the living tissue, proceeding to step (S4);

if the comparison result shows that the face reflection multi-spectral data obtained by the visible spectrum sensing area and the near-infrared spectral image sensing area matches the multi-spectral data of a mask material, an alarm of a police office and an alarm in the monitoring area sound, and a recognition process is ended; and if the comparison result shows a mismatch, proceeding to step (S4'); and (S4) denoising, by the second module, N face RGB images acquired by the RGGB image acquisition area during a motion process of the subject to be recognized;

subjecting N denoised face RGB images to feature extraction to obtain a facial feature data;

comparing, by the third module, the facial feature data with a facial image feature value in the face spectral image database; and if there is no matching data, deleting the face RGB images acquired by the RGGB image acquisition area; and if there is a matching data, the alarm of the police office and the alarm in the monitoring area sound, and the recognition process is ended; or (S4') denoising, by the second module, N near-infrared face images obtained in a motion process of the subject to be recognized;

subjecting N denoised near-infrared face images to feature extraction to obtain a facial feature data;

comparing, by the third module, the facial feature data with the facial image feature value in the face spectral image database;

if there is no matching data, deleting the N near-infrared face images; and if there is a matching data, the alarm of the police office and the alarm in the monitoring area sound, and the recognition process is ended.

Compared to the prior art, the present disclosure has the following beneficial effects.

1. With respect to the face recognition monitoring system provided herein, the silicon-based detector is divided into multiple units each having three areas. Spectral modulation films of different bands are etched on the three areas, respectively, so that a visible-near infrared face reflection multi-spectral data, a near-infrared face image and a RGGB face image can be obtained through one camera, greatly reducing the cost of the monitoring system.

2. The face recognition monitoring system provided herein integrates the visible-near infrared face refection multi-spectral data, the near-infrared face image and the RGGB face image to determine an authenticity of the human face to be recognized, and overcome the spoofing attacks such as makeup. Therefore, the monitoring system realizes a more accurate recognition of the human face, greatly improves the accuracy of monitoring, prevention and early warning, and effectively prevents the spoofing attacks such as using an imitated face mask made of silica gel and other materials.

3. A visible spectral modulation film layer and a near-infrared spectral modulation film layer of the silicon-based detector of the face recognition monitoring system provided herein both have a single-layer structure, so that the formed photoelectric sensor has a simple structure, a small volume, a thin thickness (micrometer level), a light weight, a high spectral resolution and spatial resolution, a high accuracy, and a large detection speed. The photoelectric sensor can be integrated in the existing monitoring devices to achieve the spectrum extraction and high-precision imaging, which makes the extracted human face clearer and contributes to a more accurate recognition.

4. The image and spectral information integrated face recognition method provided herein has higher face recognition accuracy by using an existing coating method of the silicon-based detector. By means of the photoelectric sensor, the unique reflection spectrum information and face image information of the human skin can be obtained, and a low-cost and convenient face recognition system is formed by using a comparison method.

DETAILED DESCRIPTION OF EXAMPLES

The technical solutions of the disclosure will be described in detail below with reference to the accompanying drawings and embodiments. However, it is obvious that these embodiments can also be implemented without some specific details. In other embodiments, for the convenience of describing one or more embodiments, well-known structures and devices are shown in a form of block diagram.

Figure 1:
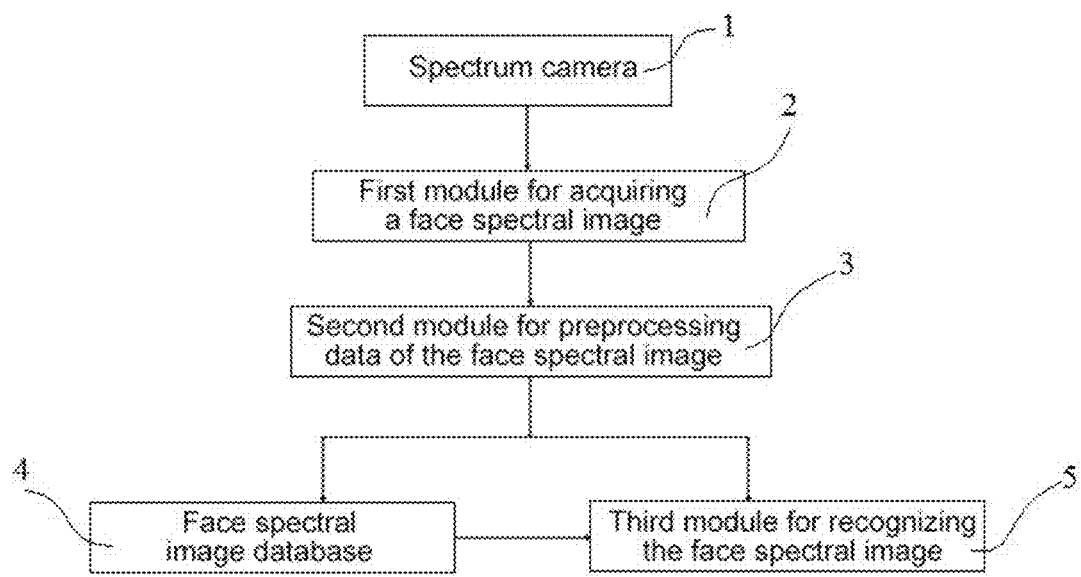
FIG. 1 is a schematic diagram of a face recognition monitoring system according to an embodiment of the present disclosure.

Embodiment 1 Face Recognition Monitoring System Based on Spectrum and Multi-Band Fusion Referring to FIG. 1, a face recognition monitoring system based on spectrum and multi-band fusion is provided, which includes a spectral camera 1, a light source (broad-band white light source, such as a bromine tungsten lamp), a first module 2 for acquiring a face spectral image, a second module 3 for preprocessing data of the face spectral image, a face spectral image database 4 and a third module 5 for recognizing the face spectral image.

Figure 2:
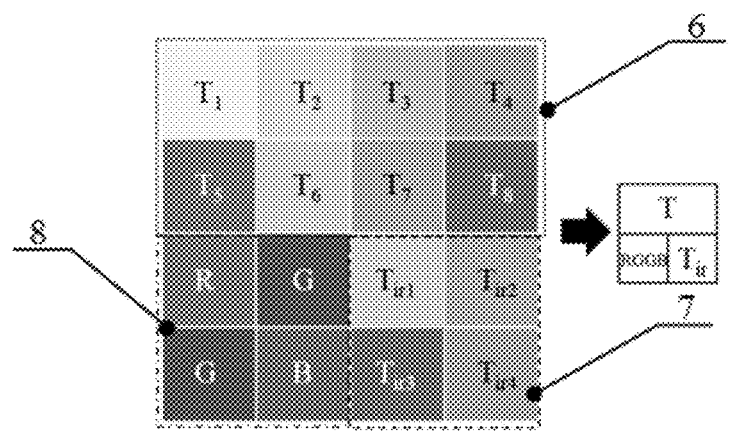
FIG. 2 is a schematic diagram of a structure of a filter film unit according to an embodiment of the present disclosure.
Figure 3:
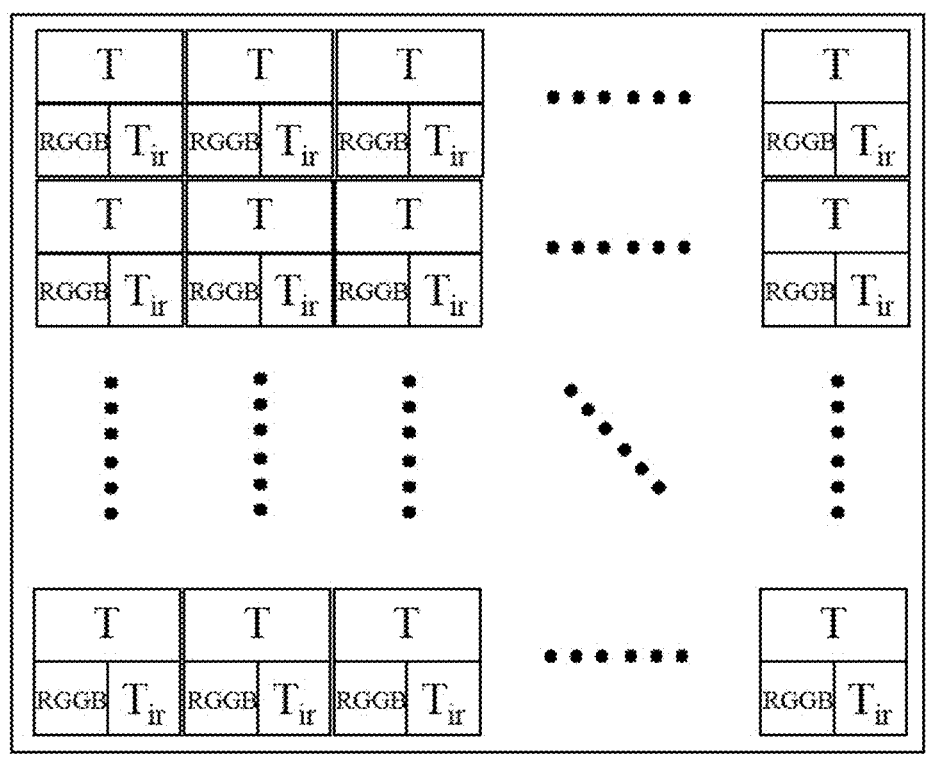
FIG. 3 is a schematic diagram of a structure of a filter film according to an embodiment of the present disclosure.
Figure 4:
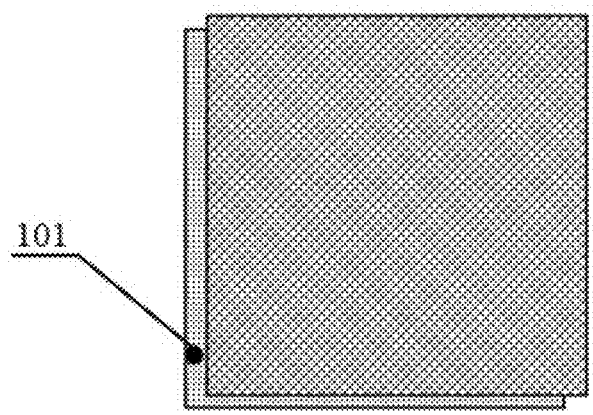
FIG. 4 is a schematic diagram of a structure of a silicon-based photoelectric sensor according to an embodiment of the present disclosure.

The spectral camera includes an optical lens and a silicon-based detector. The optical lens is capable of automatically adjusting a focal length according to a distance from a target in a monitoring area, and the silicon-based detector used herein is a CMOS image sensor with a detection band of 200-1200 nm. The silicon-based detector includes a photoelectric conversion substrate 101, and a filter film 102 arranged thereon. The filter film 102 has a thickness of 10 μm, a size of 4 mm×4 mm, and a data acquisition time of 1 ms. The filter film 102 includes N units each including three areas, respectively a visible spectrum sensing area 6, a near-infrared spectral image sensing area 7 and a RGGB image acquisition area 8. The N units cover all pixels on the photoelectric conversion substrate 101. As shown in FIGS. 2 and 3, by means of the three areas, the acquisition of visible-near infrared face reflection multi-spectral data, a near-infrared face image and a RGGB face image can be realized.

The visible spectrum sensing area 6 is configured to distinguish an incident visible light spectrum. The visible spectrum sensing area is formed by splicing 8 kinds of materials with known and different light transmittance through coating and etching one by one. The visible spectrum sensing area has a single-layer structure, including 8 sub-units $T_1, T_2 \ldots T_8$. Each of the 8 sub-units covers 1 pixel on the photoelectric conversion substrate 101. Each of the 8 sub-units has different spectral transmittance for the pixels on the photoelectric conversion substrate 101. When the spectral transmittance change, spectral modulation characteristics of different pixels in each of the 8 sub-units are different, the pixels can be combined to restore and revert a spectral line type of incident light to realize a spectral splitting function. The visible spectral sensing area, the near-infrared spectrum image sensing area and the RGGB image acquisition area together constitute a periodic structure.

A transmission band of the near-infrared spectral image sensing area 7 is divided into 780-850 nm, 850-950 nm, 950-1050 nm and 1050-1200 nm, and is configured to detect a deep-layer facial feature image in a near-infrared light band with a wavelength greater than 780 nm to eliminate an interference caused by changing a facial feature through makeup. The near-infrared spectral image sensing area is formed by splicing four materials with known and different near-infrared transmittance through coating and etching one by one. The near-infrared spectral image sensing area has a single-layer structure, including four sub-units, respectively $T_{ir1}, T_{ir2}, T_{ir3}$, and $T_{ir4}$; each of the four sub-units covers 1 pixel on the photoelectric conversion substrate 101.

The RGGB image acquisition area 8 is configured to collect a face RGB image in the monitoring area. The RGGB image acquisition area includes four sub-units respectively transmitting red, green, green and blue; each of the four sub-units of the RGGB image acquisition area covers 1 pixel on the photoelectric conversion substrate 101.

Figure 5:
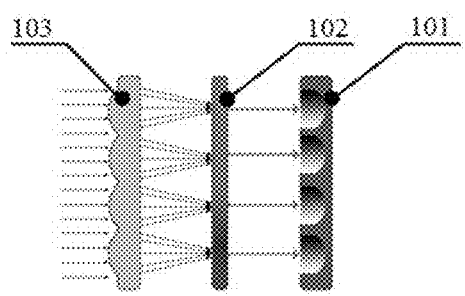
FIG. 5 is a schematic diagram of a structure of a silicon-based detector according to an embodiment of the present disclosure.

As shown in FIG. 5, in order to improve the utilization rate of energy of the incident light and an aperture ratio of the sensor, a microlens array 103 is formed on the filter film 102. The filter film 102 is coated with a layer of transparent photoresist for preparing the microlens array 103, and an area unneeded to be coated with the transparent photoresist is etched by laser direct writing or mask lithography to form the microlens array 103. The microlenses of the microlens array 103 are in one-to-one correspondence to the pixels on the photoelectric conversion substrate 101, and the microlens array is configured to converge incident light beams. A total thickness of the microlens array 103 and the filter film 102 is 30 μm, and the microlens array 103 has a size of 4 mm×4 mm, a resolution of 10 nm, and a data acquisition time of 1 ms.

The photoelectric conversion substrate 101 is configured to convert a light signal passing through the visible spectrum sensing area 6 into an electrical signal, and convert the electrical signal to form a digital signal or a code for output through amplification and analog-to-digital conversion. The photoelectric conversion substrate 101 is also configured to convert a light signal passing through the near-infrared spectral image sensing area into an electrical signal, and convert the electrical signal to form a digital signal or a code for output through amplification and analog-to-digital conversion. And the photoelectric conversion substrate 101 is also configured to convert a light signal passing through the RGGB image acquisition area into an electrical signal, and convert the electrical signal to form a digital signal or a code for output through amplification and analog-to-digital conversion.

An emission band of the light source includes a visible light band and a near-infrared light band, and the light source is configured to illuminate the monitoring area under conditions of insufficient light to enhance a deep-layer facial image acquisition.

The first module 2 is configured to inverse a face spectrum and image data according to a signal intensity information of an incident light signal and a position information of a corresponding pixel on the photoelectric conversion substrate 101, the face spectrum and image data includes a visible-near infrared face reflection multi-spectral data, a near-infrared face image and a RGGB face image. The near-infrared face image and the RGGB face image are acquired by image inversion (According to known spectral transmittance information corresponding to a spectrum on each of the pixels, an intensity value of a light signal on a corresponding pixel is corrected. A correction method is the intensity value of the light signal on the corresponding pixel divided by a spectral transmittance value on the pixel. All the pixels are combined to inverse the image information). The face reflection multi-spectral data is inversed according to formula (1):

$$S_i = \int I(\lambda) T_i(\lambda) \eta(\lambda) d\lambda, \qquad (1);$$

where S is the intensity value of the light signal output by the photoelectric conversion substrate 101; I is an incident spectrum, which is a signal to be solved; T is a spectral transmittance of the filter film 102, including a spectral transmittance $T_1$-$T_8$ of a visible light filter film 102 and a spectral transmittance $T_{ir1}$-$T_{ir4}$ of a near-infrared light filter film 102; η is a quantum efficiency of the photoelectric conversion substrate 101; and λ is an incident wavelength.

According to a spectral transmittance curve, a combination of 8 pixels in the visible spectrum sensing area and 4 pixels in the near-infrared spectral image sensing area is capable to invert and calculate a visible incident spectrum value of the 8 pixels on the visible spectrum sensing area and a near-infrared spectrum value of the 4 pixels on the near-infrared spectral image sensing area.

The second module 3 is configured to denoise (multiple images are taken in a short time, and the multiple images are averaged by pixel. For example, 10 images are obtained, and first pixels of the 10 images are averaged; and second pixels of the 10 images are averaged, and so on; i-th pixels of the 10 images are averaged to complete the denoising process) the near-infrared face image acquired in the near-infrared spectral image sensing area and the RGGB face image acquired in the RGGB face image acquisition area. A feature extraction is performed on a denoised near-infrared face image and a denoised RGGB face image. A face multi-spectral data is extracted from a multi-spectral image acquired in the visible spectrum sensing area and a multi-spectral image acquired in the near-infrared spectral sensing area. A multi-dimensional facial feature data is compared with a face spectral image and a multi-spectral data in the face spectral image database.

The face spectral image database 4 is configured to store an image feature value and spectrum data of the $N_x$ eigenfaces to be searched, and multi-spectral data of multiple mask materials, so as to facilitate a comparison with a face image and a spectrum thereof collected in the monitoring area.

The third module 5 is configured to compare the visible-near infrared face reflection multi-spectral data, a preprocessed face near-infrared face image, and a preprocessed RGGB face image data with information in the face spectral image database.

The visible spectrum sensing area is prepared as follows. n kinds of polyimide filter film materials varying in spectral transmittance are selected. A first filter film material is coated on the photoelectric conversion substrate 101, and an etching layer is coated to etch an area unneeded to be coated with the first filter film material according to a corresponding pixel on the photoelectric conversion substrate. A second filter film material is coated, and another etching layer is coated to etch an area unneeded to be coated with the second filter film material according to a corresponding pixel on the photoelectric conversion substrate 101, and so on until the n kinds of filter film materials are coated on the photoelectric conversion substrate 101. After the 8 kinds of filter film materials are coated and etched one by one, a filter film with a complete layer is finally formed, and each of the filter film 102 includes $T_1, T_2 \ldots T_8$ subunits. The near-infrared spectral image sensing area is prepared according to the steps for preparing the visible spectrum sensing area, and four kinds of filter film materials are coated on the near-infrared spectral image sensing area.

Figure 6:
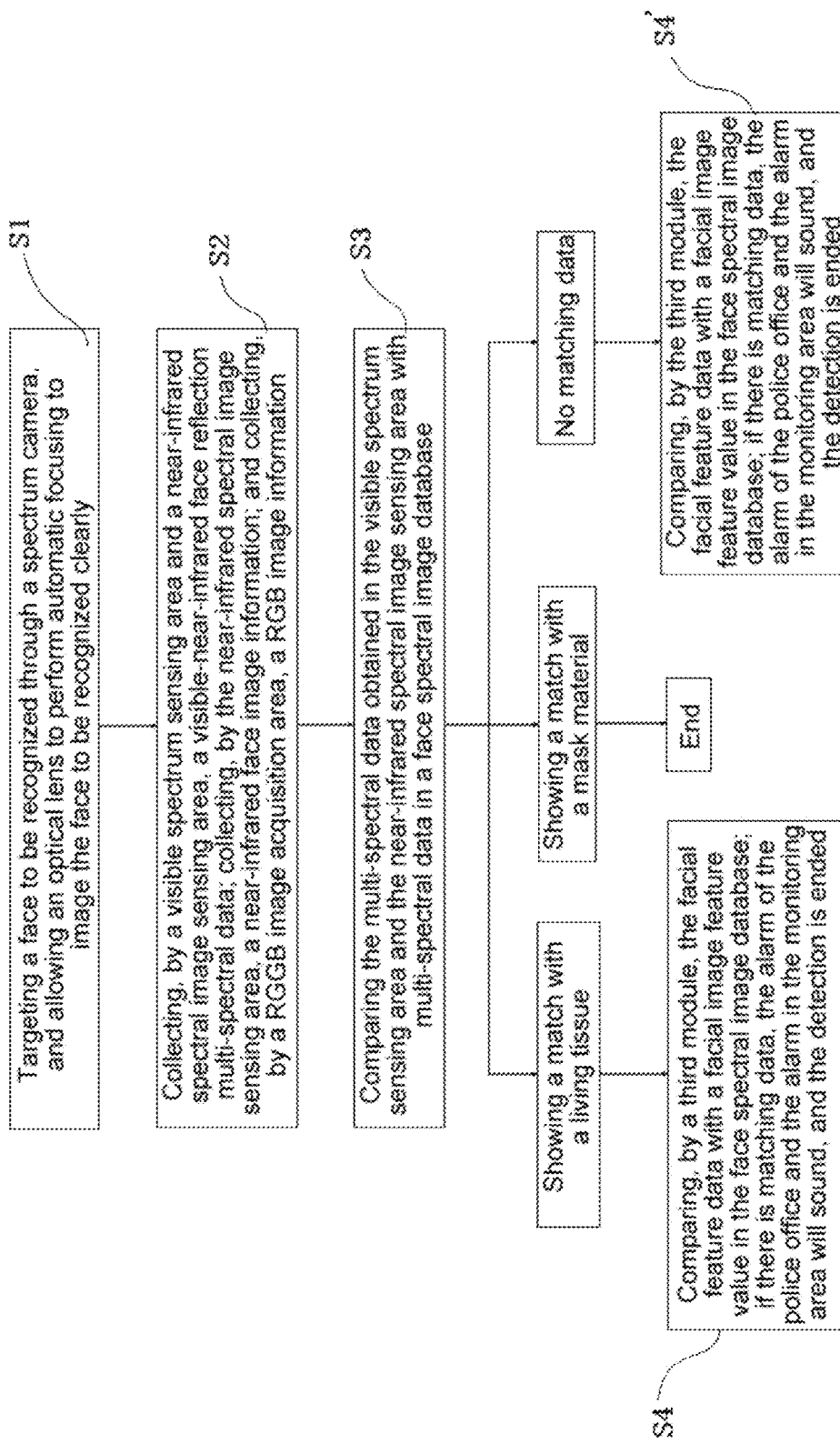
FIG. 6 is a flow chart of a face recognition method according to an embodiment of the present disclosure.

Embodiment 2 Recognition Method Using a Face Recognition Monitoring System Based on Spectrum and Multi-Band Fusion As shown in FIG. 6, a recognition method based on the face recognition monitoring system based on spectrum and multi-band fusion is provided.

(S1) An optical lens of a spectral camera is allowed to perform automatic focusing to make a face of a subject to be recognized clearly imaged when the subject to be recognized enters the monitoring area. When there are multiple subjects to be recognized, the spectral camera simultaneously targets faces of the multiple subjects to be recognized and the optical lens performs automatic focusing to make the faces of the multiple subjects to be recognized clearly imaged; and in the case of insufficient light, a light source is turned on.

(S2) A silicon-based detector and a first module are started. A face reflection multi-spectral data of the subject to be recognized is collected by a visible spectrum sensing area and a near-infrared spectral image sensing area on the silicon-based detector. A near-infrared face image information of the subject to be recognized is collected by the near-infrared spectral image sensing area. And a face RGB image information of the subject to be recognized is collected by a RGGB image acquisition area.

Figure 7:
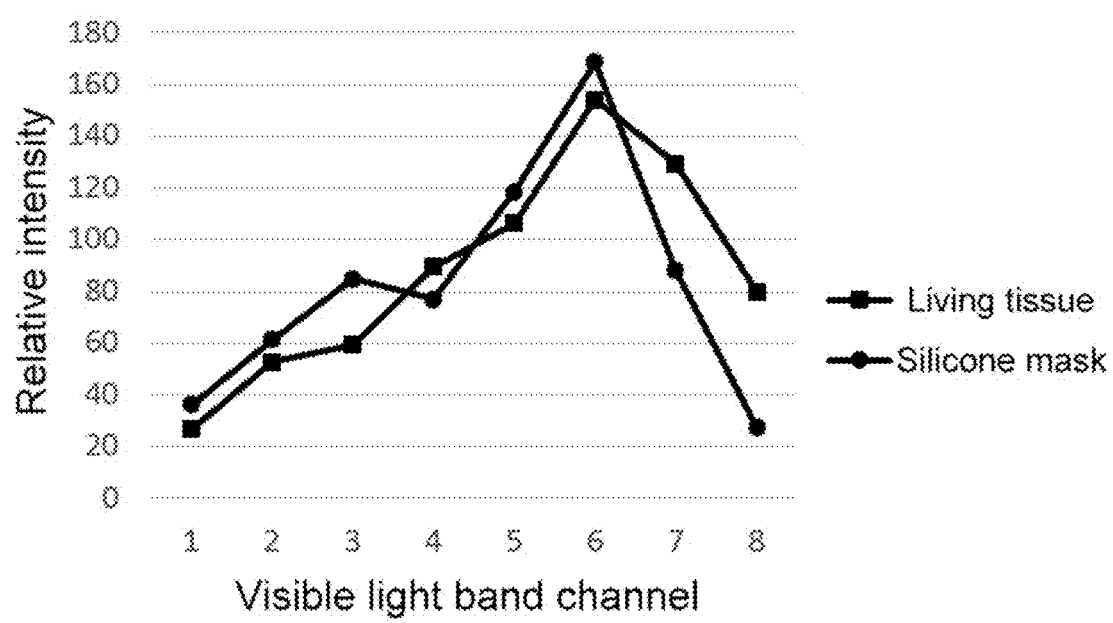
FIG. 7 schematically shows multi-spectral data of a living tissue and a silicone mask in visible light band.
Figure 8:
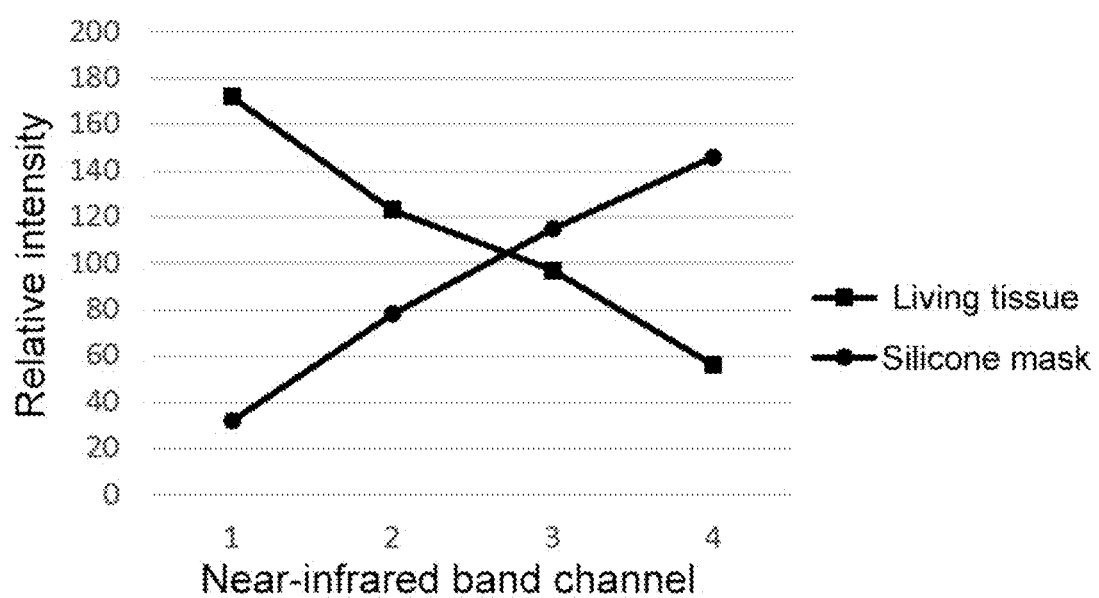
FIG. 8 schematically shows multi-spectral data of a living tissue and a silicone mask in a near-infrared band.

(S3) The face reflection multi-spectral data obtained by the visible spectrum sensing area and the near-infrared spectral image sensing area are compared with multi-spectral data of a living tissue and multiple mask materials in the face spectral image database. A face reflection multi-spectral data and a multi-spectral data of a silicone mask in the face spectral image database are shown in FIG. 7 and FIG. 8. A square-shaped line spectrum in the FIG. 7 and FIG. 8 is a spectral linearity of a living skin, and a round-shaped line spectrum is a spectral linearity of a silicone mask. A comparison method is that a system sets a discrimination threshold in advance, and then calculates a discrimination of a face reflection multi-spectral data and the face reflection multi-spectral data and the multi-spectral data of the silicone mask in the face spectral image database.

When the discrimination between the face reflection multi-spectral data and the face reflection multi-spectral data in the face spectral image database is less than or equal to the threshold, a comparison result shows that the face reflection multi-spectral data obtained by the visible spectrum sensing area and the near-infrared spectral image sensing area matches the multi-spectral data of the living tissue, proceeding to the step (S4).

When the discrimination between the face reflection multi-spectral data and the multi-spectral data of the silicone mask in the face spectral image database is less than or equal to the threshold, a comparison result shows that the face reflection multi-spectral data obtained by the visible spectrum sensing area and the near-infrared spectral image sensing area matches the multi-spectral data of a mask material, an alarm of a police office and an alarm in the monitoring area sound, and a recognition process is ended.

If a comparison result shows a mismatch, proceeding to the step (S4').

(S4) 5 face RGB images acquired by the RGGB image acquisition area during a motion process of the subject to be recognized are denoised by the second module. 5 denoised face RGB images are performed feature extraction to obtain a facial feature data. The facial feature data is compared with a facial image feature value in the face spectral image database by the third module.

If there is no matching data, the face RGB images acquired by the RGGB image acquisition are deleted.

If there is a matching data, the alarm of the police office and the alarm in the monitoring area sound, and the recognition process is ended.

(S4') 5 near-infrared face images obtained in a motion process of the subject to be recognized are denoised by the second module. 5 denoised near-infrared face images are performed feature extraction to obtain a facial feature data. The facial feature data is compared with the facial image feature value in the face spectral image database by the third module.

If there is no matching data, the 5 near-infrared face images are deleted.

If there is a matching data, the alarm of the police office and the alarm in the monitoring area sound, and the recognition process is ended.

What is claimed is:

1. A face recognition monitoring system based on spectrum and multi-band fusion, comprising:
   a spectral camera;
   a first module for acquiring a face spectral image;
   a second module for preprocessing data of the face spectral image;

a face spectral image database; and
a third module for recognizing the face spectral image;
wherein the spectral camera comprises an optical lens and a silicon-based detector; the silicon-based detector comprises a photoelectric conversion substrate and a filter film arranged on the photoelectric conversion substrate; the filter film comprises N units, and each of the N units comprises a visible spectral sensing area, a near-infrared spectral image sensing area and a red-green-green-blue (RGGB) image acquisition area; the N units cover all pixels on the photoelectric conversion substrate;
the visible spectral sensing area is configured to distinguish an incident visible light spectrum; the visible spectral sensing area is formed by splicing n kinds of materials with known and different light transmittance through coating and etching one by one; the visible spectral sensing area has a single-layer structure, comprising n sub-units $T_1, T_2 \ldots T_n$; each of the n sub-units covers M pixels on the photoelectric conversion substrate, wherein M is greater than or equal to 1; the visible spectral sensing area, the near-infrared spectral image sensing area and the RGGB image acquisition area together constitute a periodic structure;
a transmission band of the near-infrared spectral image sensing area is divided into 780-850 nm, 850-950 nm, 950-1050 nm and 1050-1200 nm, and is configured to detect a deep-layer facial feature image in a near-infrared light band with a wavelength greater than 780 nm; the near-infrared spectral image sensing area is formed by splicing four materials with known and different near-infrared transmittance through coating and etching one by one; the near-infrared spectral image sensing area has a single-layer structure, comprising four sub-units, respectively $T_{ir1}$, Tire, $T_{ir2}$, and $T_{ir4}$; each of the four sub-units covers M pixels on the photoelectric conversion substrate, wherein M is greater than or equal to 1;
the RGGB image acquisition area is configured to collect a face RGB image in a monitoring area; the RGGB image acquisition area comprises four sub-units respectively transmitting red, green, green and blue; each of the four sub-units of the RGGB image acquisition area covers M pixels on the photoelectric conversion substrate, wherein M is greater than or equal to 1;
the photoelectric conversion substrate is configured to convert a light signal passing through the visible spectral sensing area into an electrical signal, and convert the electrical signal to form a digital signal or a code for output through amplification and analog-to-digital conversion; the photoelectric conversion substrate is also configured to convert a light signal passing through the near-infrared spectral image sensing area into an electrical signal, and convert the electrical signal to form a digital signal or a code for output through amplification and analog-to-digital conversion; and the photoelectric conversion substrate is also configured to convert a light signal passing through the RGGB image acquisition area into an electrical signal, and convert the electrical signal to form a digital signal or a code for output through amplification and analog-to-digital conversion;
the first module is configured to inverse a face spectrum and image data according to a signal intensity information of an incident light and a position information of a corresponding pixel on the photoelectric conversion substrate, wherein the face spectrum and image data comprises a visible-near infrared face reflection multi-spectral data, a near-infrared face image and a RGGB face image; the near-infrared face image and the RGGB face image are acquired by image inversion; and the visible-near infrared face reflection multi-spectral data is inversed according to formula (1):

$$S_i = \int I(\lambda) T_i(\lambda) \eta(\lambda) d\lambda, \qquad (1);$$

wherein S is an intensity value of a light signal output by the photoelectric conversion substrate; I is an incident spectrum, which is a signal to be solved; T is a spectral transmittance of the filter film, comprising a spectral transmittance of a visible light filter film and a spectral transmittance of a near-infrared light filter film; $\eta$ is a quantum efficiency of the photoelectric conversion substrate; and $\lambda$ is an incident wavelength;
the second module is configured to denoise the near-infrared face image acquired in the near-infrared spectral image sensing area and the RGGB face image acquired in the RGGB image acquisition area; to perform feature extraction on a denoised near-infrared face image and a denoised RGGB face image; to extract a face multi-spectral data from a multi-spectral image acquired in the visible spectral sensing area and a multi-spectral image acquired in the near-infrared spectral image sensing area; and to compare a multi-dimensional facial feature with a face spectral image and a multi-spectral data in the face spectral image database;
the face spectral image database is configured to store an image feature value and spectrum data of $N_x$ eigenfaces to be searched, and multi-spectral data of multiple mask materials, so as to facilitate a comparison with a face image and a spectrum thereof collected in the monitoring area; and
the third module is configured to compare the visible-near infrared face reflection multi-spectral data, a preprocessed near-infrared face image and a preprocessed RGGB face image data with information in the face spectral image database.

2. The face recognition monitoring system of claim 1, further comprising:
a light source;
wherein an emission band of the light source comprises a visible light band and a near-infrared light band.

3. The face recognition monitoring system of claim 1, wherein the optical lens is capable of automatically adjusting a focal length according to a distance from a target in the monitoring area.

4. The face recognition monitoring system of claim 1, wherein the silicon-based detector is a complementary metal oxide semiconductor (CMOS) image sensor or a charge coupled device (CCD) image sensor.

5. The face recognition monitoring system of claim 1, wherein the visible spectral sensing area is prepared through steps of:
selecting n kinds of polyimide filter film materials varying in spectral transmittance;
coating a first filter film material on the photoelectric conversion substrate followed by coating an etching layer to etch an area unneeded to be coated with the first filter film material according to a corresponding pixel on the photoelectric conversion substrate; and
coating a second filter film material followed by coating another etching layer to etch an area unneeded to be coated with the second filter film material according to a corresponding pixel on the photoelectric conversion substrate, and so on until n kinds of filter film materials are coated on the photoelectric conversion substrate; and the near-infrared spectral image sensing area is prepared according to the steps for preparing the visible spectral sensing area, and four kinds of filter film materials are coated on the near-infrared spectral image sensing area.

6. The face recognition monitoring system of claim 1, wherein a microlens array is formed on the filter film; the microlens array is prepared through steps of: coating a layer of a transparent photoresist on the filter film; and etching an area unneeded to be coated with the transparent photoresist by laser direct writing or mask lithography to form the microlens array; wherein microlenses of the microlens array are in one-to-one correspondence to all pixels on the photoelectric conversion substrate, and the microlens array is configured to converge incident light beams.

7. A recognition method based on the face recognition monitoring system of claim 1, comprising:

(S1) allowing the optical lens of the spectral camera to automatically perform to make a face of a subject to be recognized clearly imaged when the subject to be recognized enters the monitoring area; wherein when there are multiple subjects to be recognized, the spectral camera simultaneously targets faces of the multiple subjects to be recognized and the optical lens performs automatic focusing to make the faces of the multiple subjects to be recognized clearly imaged; and in the case of insufficient light, a light source is turned on;

(S2) starting the silicon-based detector and the first module;

collecting, by the visible spectral sensing area and the near-infrared spectral image sensing area on the silicon-based detector, a face reflection multi-spectral data of the subject to be recognized;

collecting, by the near infrared spectrum image sensing area, a near-infrared face image information of the subject to be recognized; and collecting, by the RGGB image acquisition area, a face RGB image information of the subject to be recognized;

(S3) comparing the face reflection multi-spectral data obtained by the visible spectral sensing area and the near-infrared spectral image sensing area with multi-spectral data of a living tissue and multiple mask materials in the face spectral image database;

if a comparison result shows that the face reflection multi-spectral data obtained by the visible spectral sensing area and the near-infrared spectral image sensing area matches the multi-spectral data of the living tissue, proceeding to step (S4);

if the comparison result shows a mismatch, proceeding to step (S4'); and (S4) denoising, by the second module, N face RGB images acquired by the RGGB image acquisition area during a motion process of the subject to be recognized;

subjecting N denoised face RGB images to feature extraction to obtain a facial feature data;

comparing, by the third module, the facial feature data with a facial image feature value in the face spectral image database; and if there is no matching data, deleting the face RGB images acquired by the RGGB image acquisition area; and if there is a matching data, an alarm of a police office and an alarm in the monitoring area sound, and a recognition process is ended; or (S4') denoising, by the second module, N near-infrared face images obtained in a motion process of the subject to be recognized;

subjecting N denoised near-infrared face images to feature extraction to obtain a facial feature data;

comparing, by the third module, the facial feature data with the facial image feature value in the face spectral image database;

if there is no matching data, deleting the N near-infrared face images; and if there is a matching data, the alarm of the police office and the alarm in the monitoring area sound, and the recognition process is ended.

* * * * *